(12) United States Patent
Terry et al.

(10) Patent No.: US 10,621,313 B2
(45) Date of Patent: Apr. 14, 2020

(54) DISTRIBUTION AND ENFORCEMENT OF PER-FEATURE-SET SOFTWARE APPLICATION LICENSING

(71) Applicant: ServiceNow, Inc., Santa Clara, CA (US)

(72) Inventors: David Terry, San Jose, CA (US); Neha Dube, Campbell, CA (US); Saurabh Khetan, Fremont, CA (US); Parvathavardhini Shankaranarayanan, Union City, CA (US)

(73) Assignee: ServiceNow, Inc., Santa Clara, CA (US)

( * ) Notice: Subject to any disclaimer, the term of this patent is extended or adjusted under 35 U.S.C. 154(b) by 201 days.

(21) Appl. No.: 15/786,080

(22) Filed: Oct. 17, 2017

(65) Prior Publication Data
US 2019/0114397 A1 Apr. 18, 2019

Related U.S. Application Data

(60) Provisional application No. 62/568,087, filed on Oct. 4, 2017.

(51) Int. Cl.
*G06F 21/00* (2013.01)
*G06F 21/10* (2013.01)
*H04L 29/06* (2006.01)

(52) U.S. Cl.
CPC .......... *G06F 21/105* (2013.01); *H04L 63/20* (2013.01); *H04L 63/0272* (2013.01); *H04L 63/0281* (2013.01)

(58) Field of Classification Search
CPC ...... G06F 21/105; G06F 21/10; G06F 21/121; H04L 63/0272; H04L 63/0281; H04L 63/20; H04L 67/34
See application file for complete search history.

(56) References Cited

U.S. PATENT DOCUMENTS 6,029,145 A 2/2000 Barritz et al.
7,124,101 B1 10/2006 Mikurak
(Continued)

*Primary Examiner* — Joseph P Hirl
*Assistant Examiner* — Ka Shan Choy
(74) *Attorney, Agent, or Firm* — Fletcher Yoder PC

(57) ABSTRACT

A system may include a central computational instance disposed within a remote network management platform, where the central computational instance provides authoritative representations of software application licensing information to other computational instances, and where the other computational instances are dedicated to respective managed networks. The system may also include a particular computational instance that is configured to receive a representation of particular software application licensing information for a particular software application installed within the particular computational instance. The representation may include a set of entitlements, where an entitlement of the set of entitlements, when activated for the particular computational instance, allows the particular computational instance use of one or more features of the particular software application that are associated with the entitlement, and where the entitlement, when deactivated for the particular computational instance, prevents the particular computational instance from using the one or more features.

20 Claims, 10 Drawing Sheets

(56) References Cited

U.S. PATENT DOCUMENTS

| | | | | |
|---|---|---|---|---|
| 7,603,318 | B1* | 10/2009 | Colosso | G06Q 30/06 705/51 |
| 9,552,491 | B1* | 1/2017 | Giforos | G06F 21/78 |
| 2002/0065780 | A1* | 5/2002 | Barritz | G06F 21/10 705/59 |
| 2009/0249488 | A1* | 10/2009 | Robinson | G06F 21/10 726/26 |
| 2013/0144755 | A1* | 6/2013 | Mowatt | G06Q 30/06 705/26.41 |
| 2017/0149835 | A1* | 5/2017 | Mitevski | H04L 63/108 |
| 2018/0096361 | A1* | 4/2018 | Gilchrist | G06Q 30/0185 |

* cited by examiner

800 — TRANSMIT, BY A CENTRAL COMPUTATIONAL INSTANCE OF A PLURALITY OF COMPUTATIONAL INSTANCES DISPOSED WITHIN A REMOTE NETWORK MANAGEMENT PLATFORM, AUTHORITATIVE REPRESENTATIONS OF SOFTWARE APPLICATION LICENSING INFORMATION TO OTHER COMPUTATIONAL INSTANCES OF THE PLURALITY OF COMPUTATIONAL INSTANCES, WHEREIN THE OTHER COMPUTATIONAL INSTANCES ARE DEDICATED TO RESPECTIVE MANAGED NETWORKS OPERATED BY RESPECTIVE ENTITIES

802 — RECEIVE, BY A PARTICULAR COMPUTATIONAL INSTANCE OF THE PLURALITY OF COMPUTATIONAL INSTANCES AND FROM THE CENTRAL COMPUTATIONAL INSTANCE, A REPRESENTATION OF PARTICULAR SOFTWARE APPLICATION LICENSING INFORMATION FOR A PARTICULAR SOFTWARE APPLICATION INSTALLED WITHIN THE PARTICULAR COMPUTATIONAL INSTANCE, WHEREIN THE PARTICULAR SOFTWARE APPLICATION INCLUDES EXECUTABLE CODE AND DATABASE TABLES, WHEREIN EACH FEATURE ASSOCIATED WITH THE ENTITLEMENT USES ONE OR MORE OF THE DATABASE TABLES, WHEREIN THE REPRESENTATION INCLUDES A SET OF ENTITLEMENTS, WHEREIN AN ENTITLEMENT OF THE SET OF ENTITLEMENTS, WHEN ACTIVATED FOR THE PARTICULAR COMPUTATIONAL INSTANCE, ALLOWS THE PARTICULAR COMPUTATIONAL INSTANCE USE OF ONE OR MORE FEATURES OF THE PARTICULAR SOFTWARE APPLICATION THAT ARE ASSOCIATED WITH THE ENTITLEMENT, AND WHEREIN THE ENTITLEMENT, WHEN DEACTIVATED FOR THE PARTICULAR COMPUTATIONAL INSTANCE, PREVENTS THE PARTICULAR COMPUTATIONAL INSTANCE FROM USING THE ONE OR MORE FEATURES

804 — PREVENT MODIFICATION FROM WITHIN THE PARTICULAR COMPUTATIONAL INSTANCE, BY AN ACCESS HANDLER OF THE PARTICULAR COMPUTATIONAL INSTANCE, TO ANY OF THE DATABASE TABLES USED BY FEATURES OF THE ENTITLEMENTS THAT ARE DEACTIVATED FOR THE PARTICULAR COMPUTATIONAL INSTANCE

FIG. 8

DISTRIBUTION AND ENFORCEMENT OF PER-FEATURE-SET SOFTWARE APPLICATION LICENSING

CROSS-REFERENCE TO RELATED APPLICATION

This application claims priority to U.S. provisional patent application No. 62/568,087, filed Oct. 4, 2017, which is hereby incorporated by reference in its entirety.

BACKGROUND

Remote network management platforms include cloud-based services that facilitate controlling operational aspects of a managed network. For instance, an enterprise may acquire services of a remote network management platform to use pre-established or custom workflows for the enterprise's specific needs. In addition to a core set of remotely-accessed software applications provided by the remote network management platform, optional and third-party software applications, as well as optional features of the core set, may also be available.

SUMMARY

Traditional software licensing techniques do not address the particular problems found in managing software licenses in a remote network management platform. Rather than distributing software applications to individual client devices or server devices, the remote network management platform may install the software applications on a computational instance (e.g., a cluster of computing nodes) within the remote network management platform, where the computational instance is dedicated to a managed network of the enterprise. Users and computing devices on the managed network may remotely access these installed software applications.

A software application deployed in this manner may be licensed such that some sets of features therein (where these sets are referred to as entitlements) can be activated or deactivated depending on whether the managed network has acquired a license for each entitlement. For instance, a hardware asset management application may support, by default, cataloging up to 500 distinct hardware devices (e.g., computing devices, routers, gateways, load balancers, and so on). But this application may have an optional feature to support over 500 devices. In order to obtain use of this optional feature, the managed network might purchase or otherwise obtain the entitlement with the feature. Then, the computational instance may work in coordination with the remote network management platform to distribute the entitlement to the application, activate the entitlement and its associated features, and otherwise enforce the license.

Accordingly, a first example embodiment may involve a central computational instance of a plurality of computational instances disposed within a remote network management platform, where the central computational instance provides authoritative representations of software application licensing information to other computational instances of the plurality of computational instances, and where the other computational instances are dedicated to respective managed networks operated by respective entities. The first example embodiment may also involve a particular computational instance of the plurality of computational instances, where the particular computational instance is configured to receive a representation of particular software application licensing information for a particular software application installed within the particular computational instance, where the representation includes a set of entitlements, where an entitlement of the set of entitlements, when activated for the particular computational instance, allows the particular computational instance use of one or more features of the particular software application that are associated with the entitlement, and where the entitlement, when deactivated for the particular computational instance, prevents the particular computational instance from using the one or more features. The particular software application may include executable code and database tables, where each feature associated with the entitlement uses one or more of the database tables. An access handler of the particular computational instance may prevent modification, from within the particular computational instance, to any of the database tables used by features of the entitlements that are deactivated for the particular computational instance.

A second example embodiment may involve transmitting, by a central computational instance of a plurality of computational instances disposed within a remote network management platform, authoritative representations of software application licensing information to other computational instances of the plurality of computational instances, where the other computational instances are dedicated to respective managed networks operated by respective entities. The second example embodiment may also involve receiving, by a particular computational instance of the plurality of computational instances and from the central computational instance, a representation of particular software application licensing information for a particular software application installed within the particular computational instance, where the particular software application includes executable code and database tables, where the representation includes a set of entitlements, where an entitlement of the set of entitlements, when activated for the particular computational instance, allows the particular computational instance use of one or more features of the particular software application that are associated with the entitlement, and where the entitlement, when deactivated for the particular computational instance, prevents the particular computational instance from using the one or more features. The second example embodiment may also involve preventing modification from within the particular computational instance, by an access handler of the particular computational instance, to any of the database tables used by features of the entitlements that are deactivated for the particular computational instance. Each feature associated with the entitlement may use one or more of the database tables.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These as well as other embodiments, aspects, advantages, and alternatives will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 8 is a flow chart, in accordance with example embodiments.

DETAILED DESCRIPTION

Figure 1:
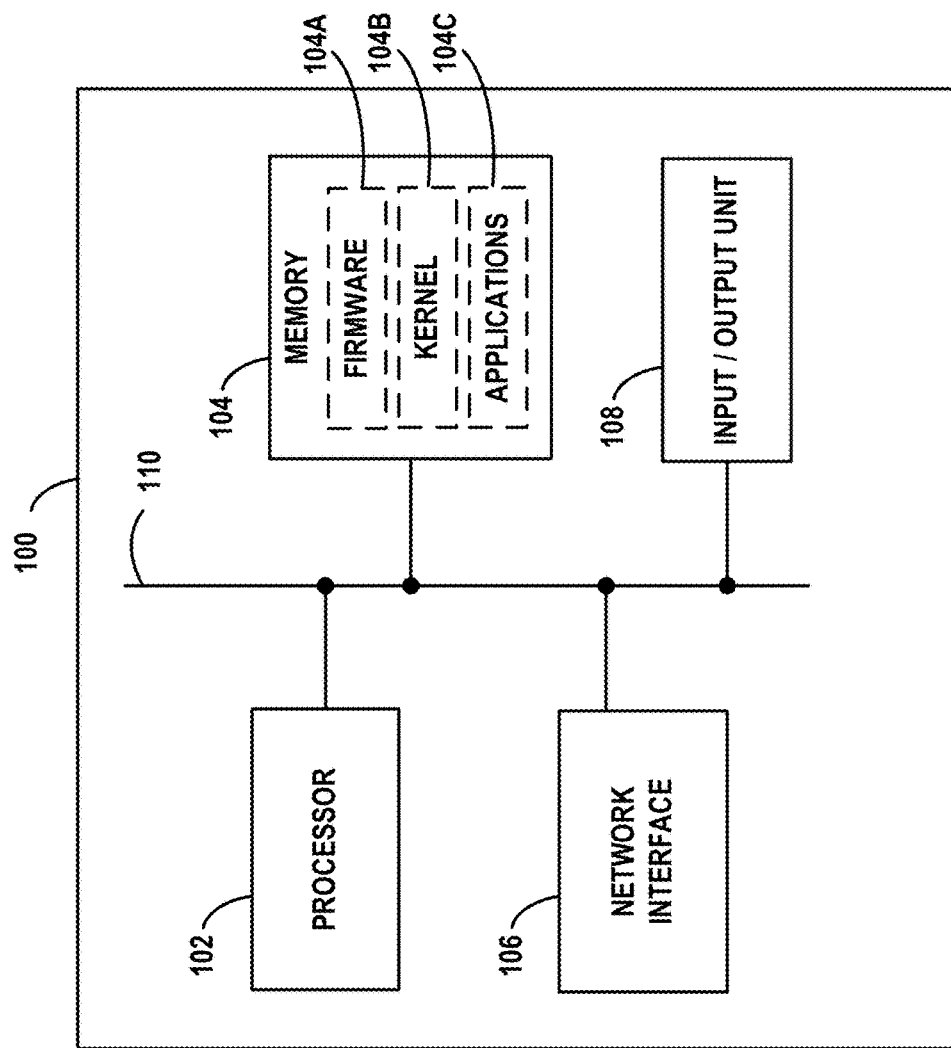
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its business, innovate, and meet regulatory requirements. The enterprise may find it difficult to integrate, streamline and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflow for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data is stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of pre-defined functionality that can be added to applications. These features include support for searching, email, templating, workflow design, reporting, analytics, social media, scripting, mobile-friendly output, and customized GUIs.

The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and an input/output unit 108, all of which may be coupled by a system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling and management of processes, input/output, and communication. Kernel 104B may also include device drivers that allow the operating system to communicate with the hardware modules (e.g., memory units, networking interfaces, ports, and busses), of computing device 100. Applications 104C may be one or more user-space software programs, such as web browsers or email clients, as well as any software libraries used by these programs. Memory 104 may also store data used by these and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with example computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more instances of computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
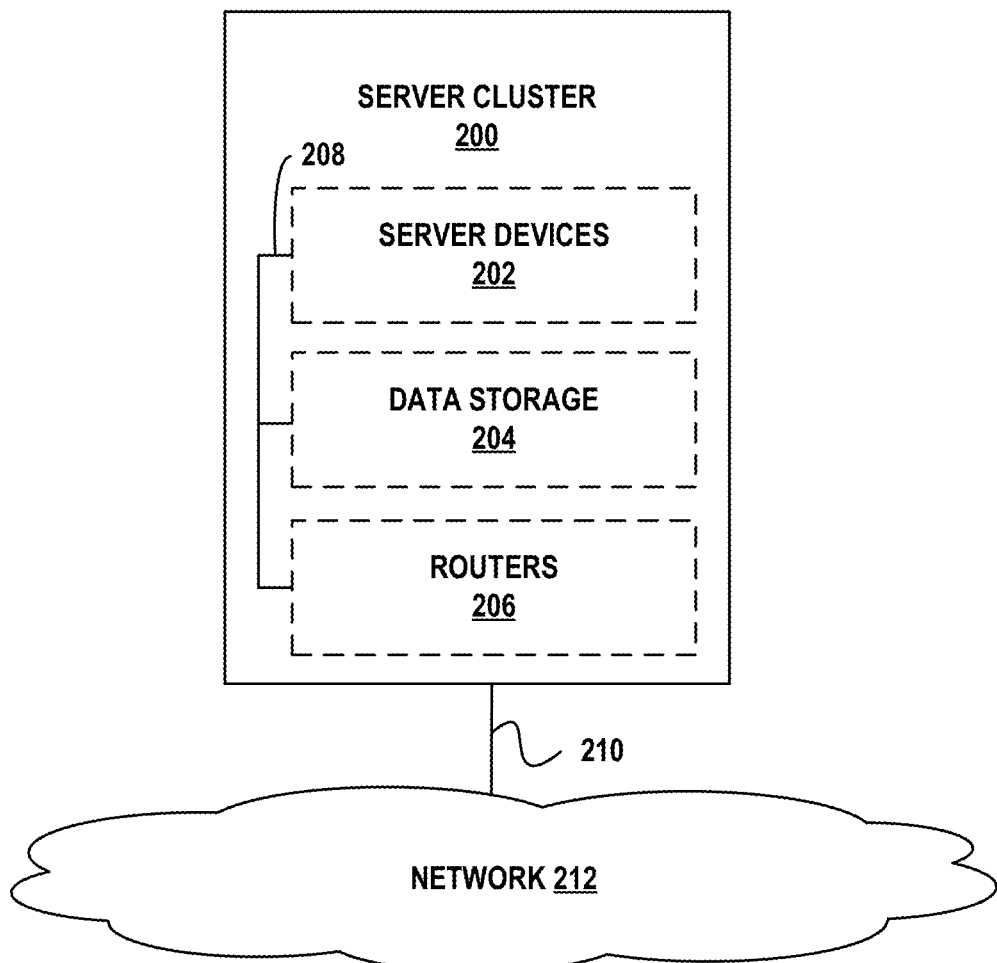
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purpose of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of cluster data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via cluster network 208, and/or (ii) network communications between the server cluster 200 and other devices via communication link 210 to network 212.

Additionally, the configuration of cluster routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from cluster data storage 204. This transmission and retrieval may take the form of SQL queries or other types of database queries, and the output of such queries, respectively. Additional text, images, video, and/or audio may be included as well. Furthermore, server devices 202 may organize the received data into web page representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JavaScript, and so on. Computer program code written in these languages may facilitate the providing of web pages to client devices, as well as client device interaction with the web pages.

III. EXAMPLE REMOTE NETWORK MANAGEMENT ARCHITECTURE

Figure 3:
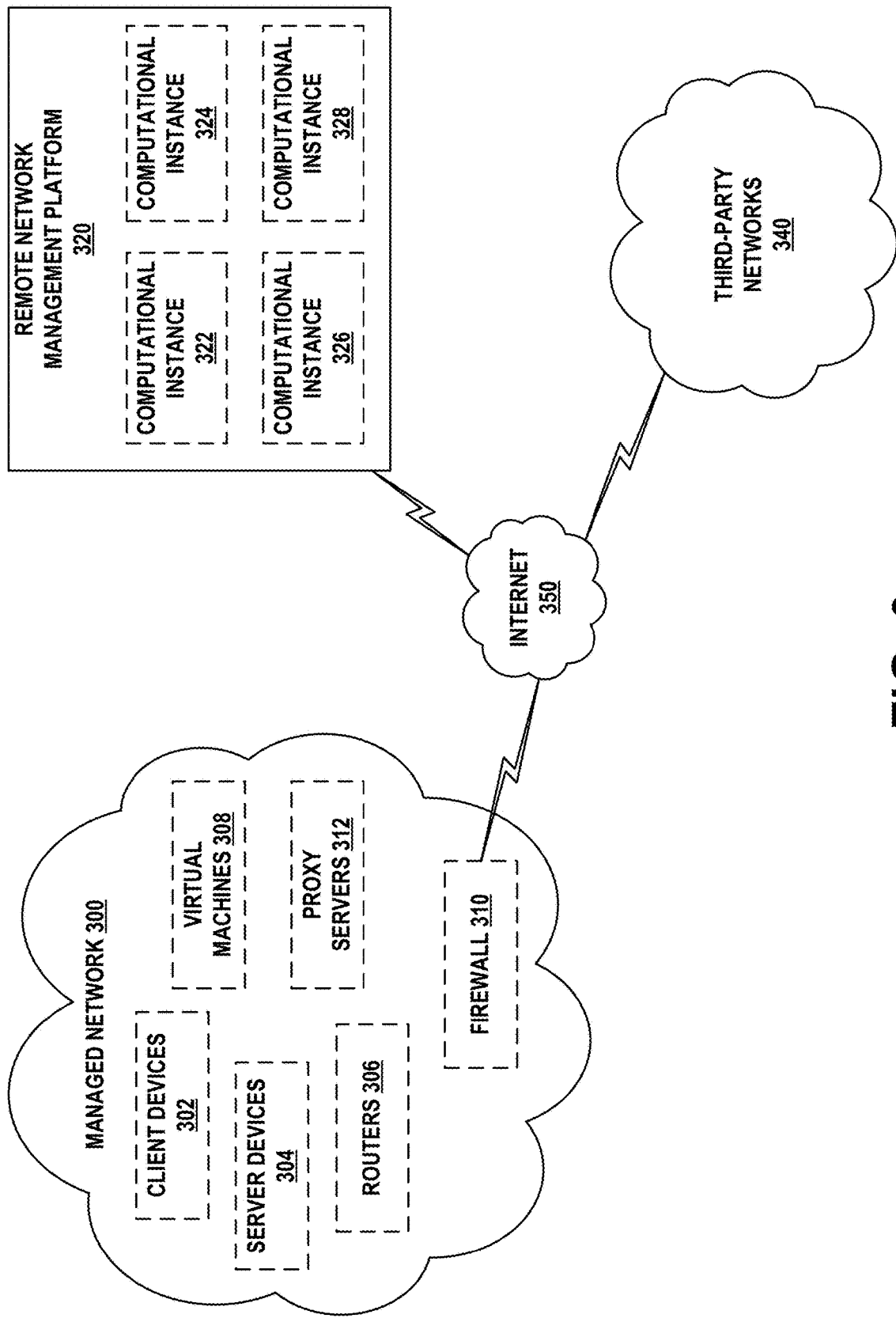
FIG. 3 depicts a remote network management architecture, in accordance with example embodiments.

FIG. 3 depicts a remote network management architecture, in accordance with example embodiments. This architecture includes three main components, managed network 300, remote network management platform 320, and third-party networks 340, all connected by way of Internet 350.

Managed network 300 may be, for example, an enterprise network used by a business for computing and communications tasks, as well as storage of data. Thus, managed network 300 may include various client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server device that facilitates communication and movement of data between managed network 300, remote network management platform 320, and third-party networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of third-party networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

Remote network management platform 320 is a hosted environment that provides aPaaS services to users, particularly to the operators of managed network 300. These services may take the form of web-based portals, for instance. Thus, a user can securely access remote network management platform 320 from, for instance, client devices 302, or potentially from a client device outside of managed network 300. By way of the web-based portals, users may design, test, and deploy applications, generate reports, view analytics, and perform other tasks.

As shown in FIG. 3, remote network management platform 320 includes four computational instances 322, 324, 326, and 328. Each of these instances may represent a set of web portals, services, and applications (e.g., a wholly-functioning aPaaS system) available to a particular customer. In some cases, a single customer may use multiple computational instances. For example, managed network 300 may be an enterprise customer of remote network management platform 320, and may use computational instances 322, 324, and 326. The reason for providing multiple instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation.

The multi-instance architecture of remote network management platform 320 is in contrast to conventional multi-tenant architectures, over which multi-instance architectures have several advantages. In multi-tenant architectures, data from different customers (e.g., enterprises) are comingled in a single database. While these customers' data are separate from one another, the separation is enforced by the software that operates the single database. As a consequence, a security breach in this system may impact all customers' data, creating additional risk, especially for entities subject to governmental, healthcare, and/or financial regulation. Furthermore, any database operations that impact one customer will likely impact all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In order to support multiple computational instances in an efficient fashion, remote network management platform 320 may implement a plurality of these instances on a single hardware platform. For example, when the aPaaS system is implemented on a server cluster such as server cluster 200, it may operate a virtual machine that dedicates varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

Third-party networks 340 may be remote server devices (e.g., a plurality of server clusters such as server cluster 200) that can be used for outsourced computational, data storage, communication, and service hosting operations. These servers may be virtualized (i.e., the servers may be virtual machines). Examples of third-party networks 340 may include AMAZON WEB SERVICES® and MICROSOFT® Azure. Like remote network management platform 320, multiple server clusters supporting third-party networks 340 may be deployed at geographically diverse locations for purposes of load balancing, redundancy, and/or high availability.

Managed network 300 may use one or more of third-party networks 340 to deploy applications and services to its clients and customers. For instance, if managed network 300 provides online music streaming services, third-party networks 340 may store the music files and provide web interface and streaming capabilities. In this way, the enterprise of managed network 300 does not have to build and maintain its own servers for these operations.

Remote network management platform 320 may include modules that integrate with third-party networks 340 to expose virtual machines and managed services therein to managed network 300. The modules may allow users to request virtual resources and provide flexible reporting for third-party networks 340. In order to establish this functionality, a user from managed network 300 might first establish an account with third-party networks 340, and request a set of associated resources. Then, the user may enter the account information into the appropriate modules of remote network management platform 320. These modules may then automatically discover the manageable resources in the account, and also provide reports related to usage, performance, and billing.

Internet 350 may represent a portion of the global Internet. However, Internet 350 may alternatively represent a different type of network, such as a private wide-area or local-area packet-switched network.

Figure 4:
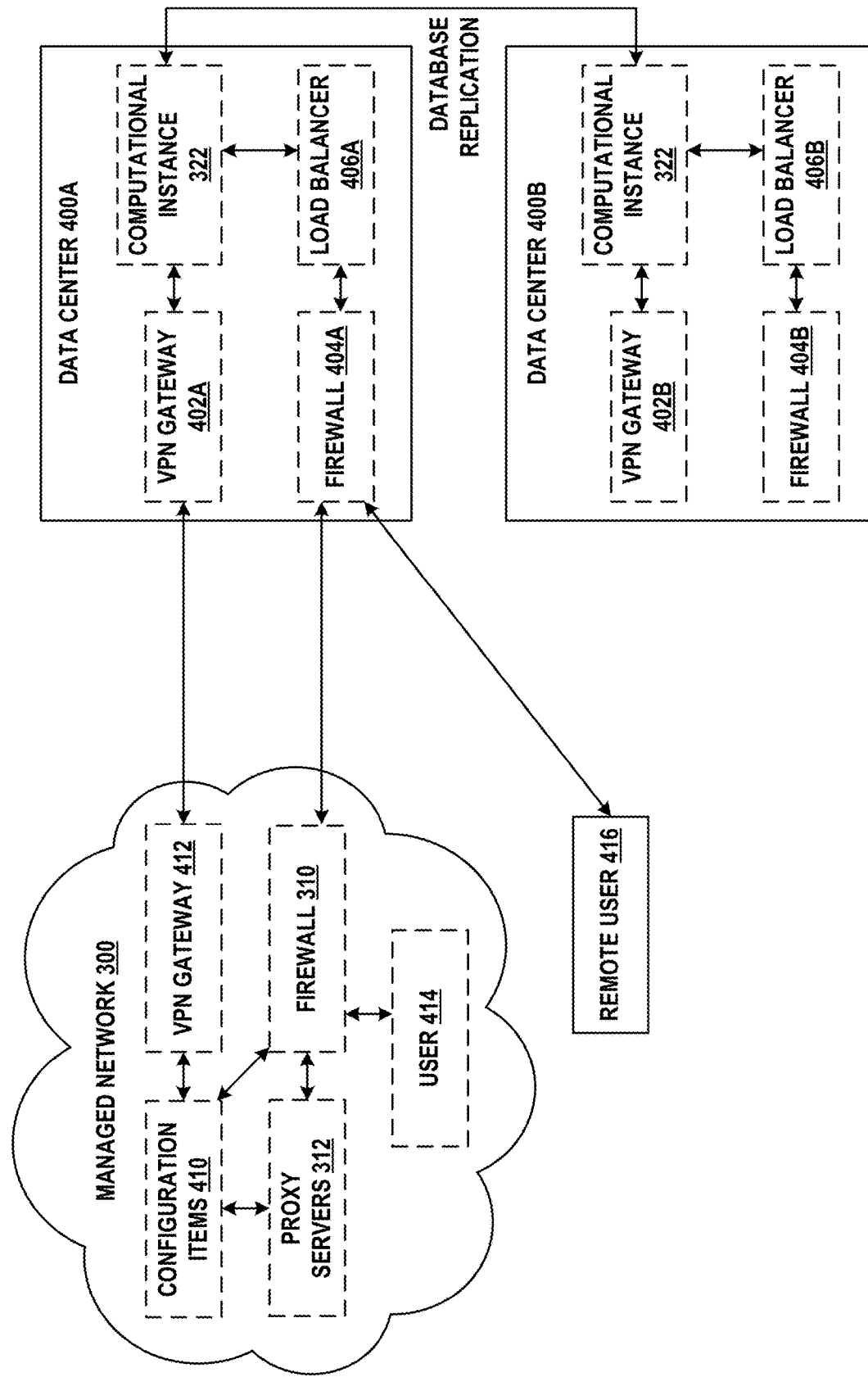
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, and well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purpose of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
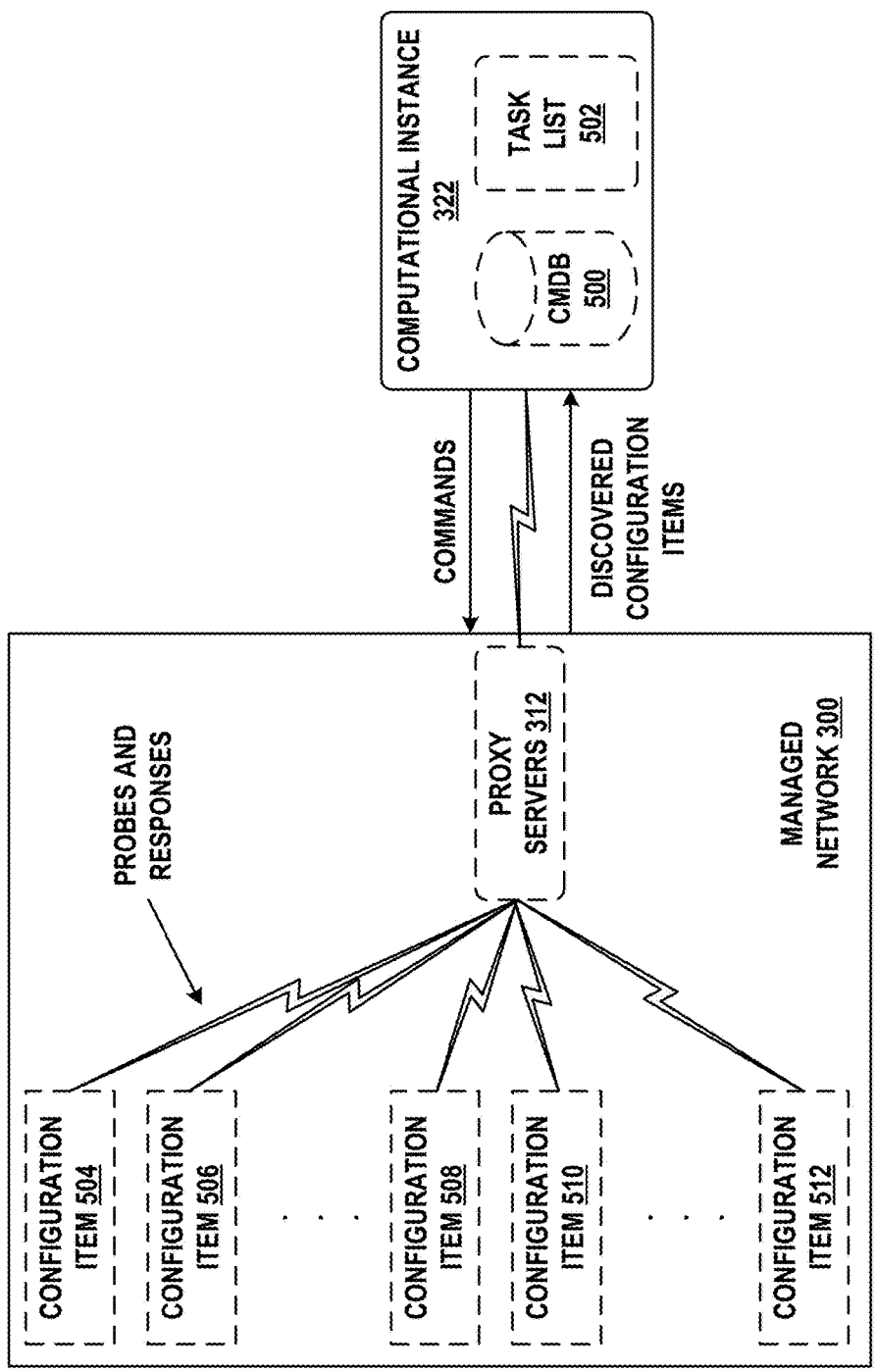
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, third-party networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration. Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For instance, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

Figure 5B:
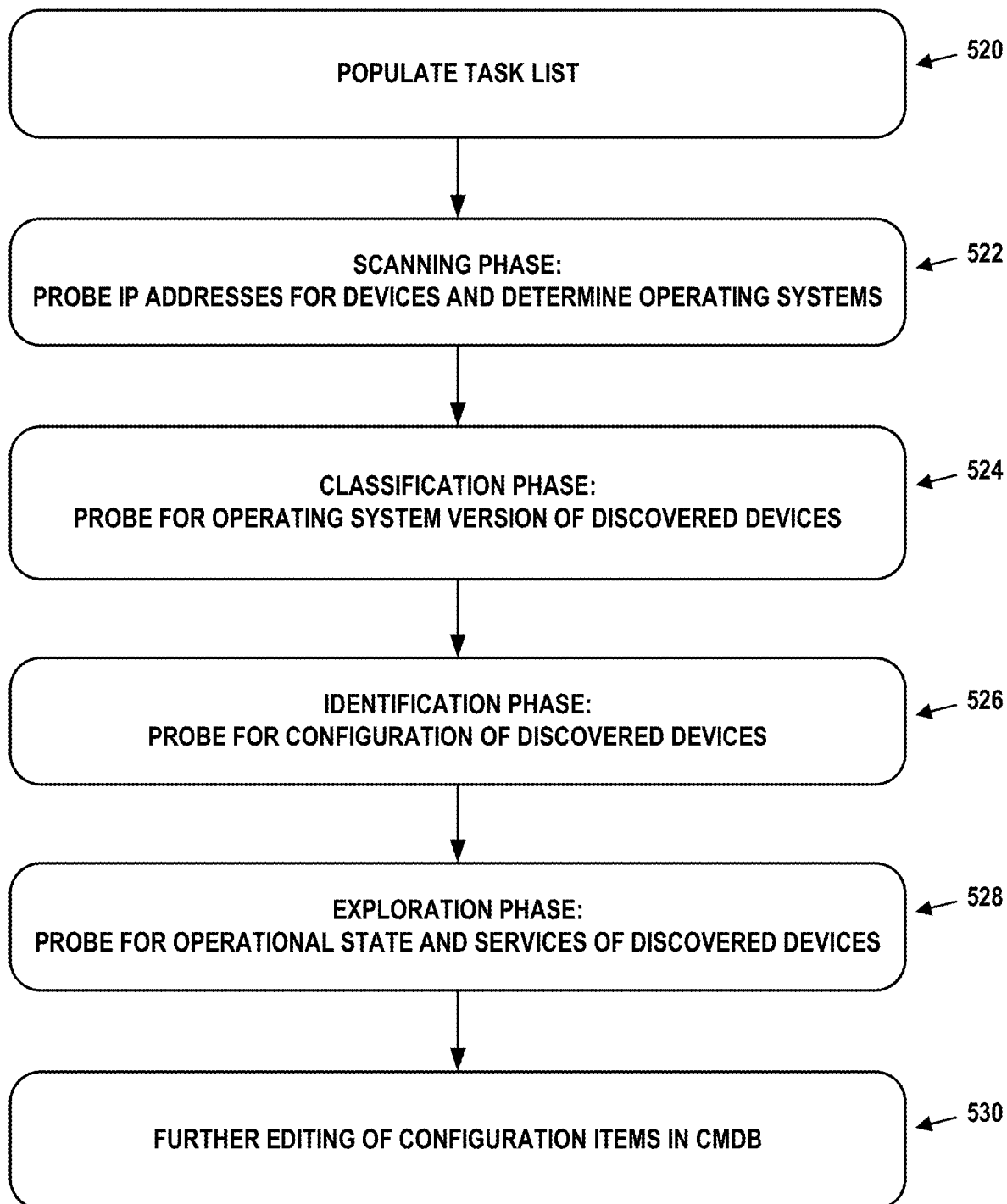
FIG. 5B is a flow chart, in accordance with example embodiments.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are for purpose of example. Discovery may be a highly configurable procedure that can have more or fewer phases, and the operations of each phase may vary. In some cases, one or more phases may be customized, or may otherwise deviate from the exemplary descriptions above.

V. EXAMPLE SOFTWARE LICENSING ARCHITECTURE

Software licenses can be allocated in various ways. Traditionally, these licenses were distributed on a per-user, per-concurrent-user, per-seat, per-device, per-processor, per-core, or per-timeframe basis, among other possibilities. For instance, a unit of software with a 50 concurrent user license would allow no more than 50 users to simultaneously access the software. A license enforcement mechanism, built into either the software itself or the platform on which it executes, may prevent these licensing terms from being violated. Thus, in the example of the software with the 50 concurrent user license, the license enforcement mechanism may block a 51st simultaneous user from accessing the software.

Regardless of the type of software license or its exact terms, deployment of flexible and enforceable licensing on a remote network management platform has its own unique set of challenges. Software applications may be distributed to and installed on computational instances associated with managed networks. A particular managed network may obtain a license that provides certain sets of features (where these sets are referred to as entitlements) of interest to the particular managed network.

The software applications distributed in this fashion may differ from traditional software applications. Rather than being standalone units of program code and data, software applications useable on a remote network management platform may rely upon services of that platform, such as application programming interfaces (APIs), to operate. Thus, these software applications may include program code and data, and may also define GUI pages and database tables to store at least some of the data. When such a software application is installed on the computational instance, the GUI pages and database tables are installed as well.

In some environments, certain users associated with the managed network may have administrative control over software applications GUI pages, and database tables installed thereon. As a consequence, these users may be able to disable any license enforcement techniques built into the program code or associated with the GUI pages and/or database tables. For example, if a license enforcement mechanism attempts to limit access to certain GUI pages, tables, or entries therein related to unlicensed features with access control lists (ACLs), the users with administrative control may be able to modify these ACLs so that the unlicensed features become available to the managed network.

As a way of overcoming these limitations, license enforcement can be built into the core program code of the remote network management platform itself. Even administrative users of computational instances in the remote network management platform cannot access this core program code. Thus, these users cannot disable license enforcement mechanisms provided therein.

A. Software Licensing on a Remote Network Management Platform

Figure 6A:
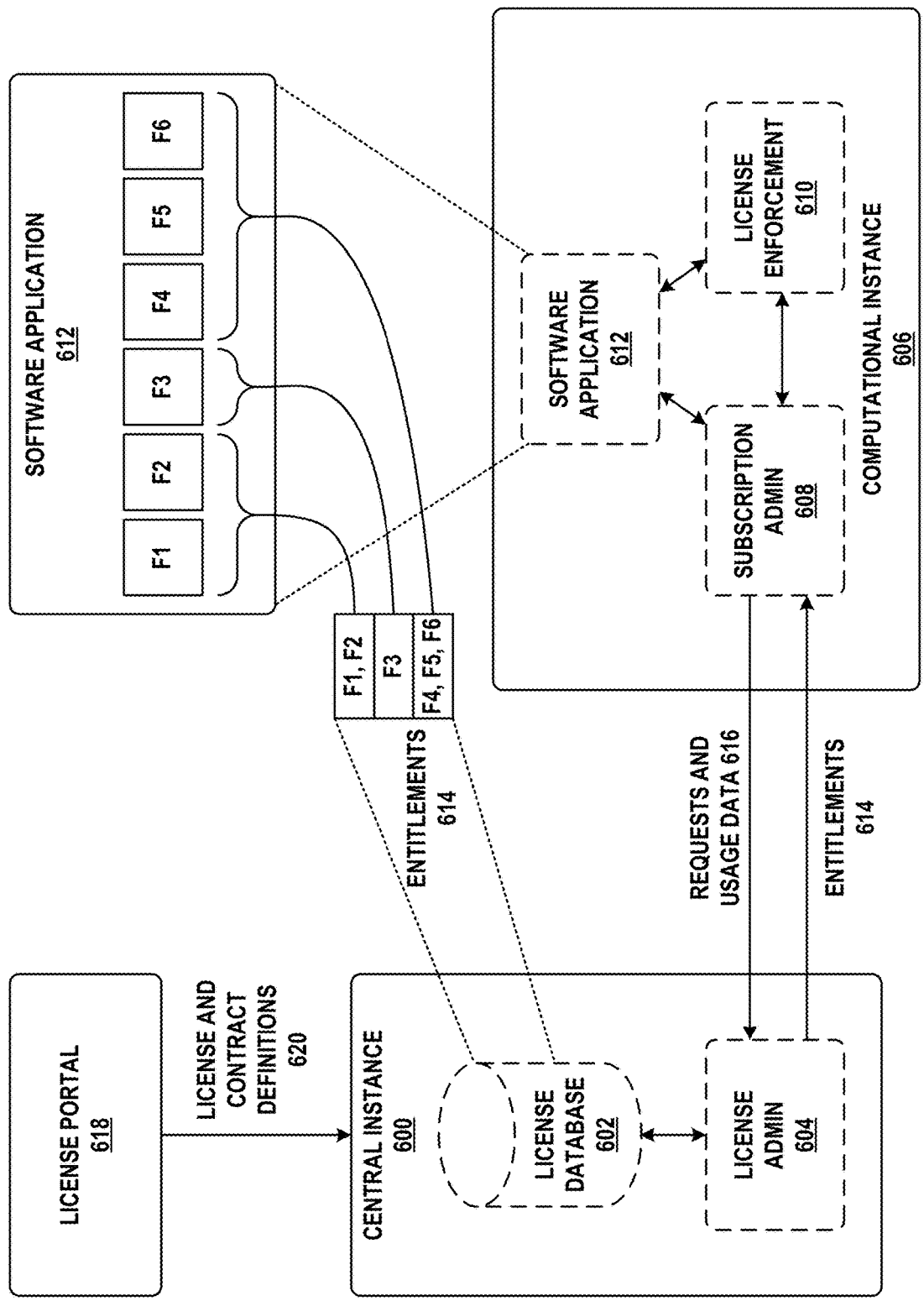
FIG. 6A is a software licensing architecture for a remote network management platform, in accordance with example embodiments.

FIG. 6A depicts a software licensing architecture for a remote network management platform, such as remote network management platform 320. Contained within this platform is central instance 600 and computational instance 606. Central instance 600 may be a computational instance that is not associated with a specific managed network, and instead is used for administration of the remote network management platform. Computational instance 606, on the other hand, may be associated with a specific managed network, not unlike computational instances 322, 324, 326, and 328.

FIG. 6A also includes license portal 618. This portal may be used by administrators of the remote network management platform to define licenses and contract information for software applications available by way of the remote network management platform. Thus, license portal 618 may be a web-based portal, and may be part of central instance 600. As an example, license portal 618 may allow these administrators to define, for software application 612, a set of entitlements. Each of these entitlements may include one or more distinct features, and each may also be licensed separately. Further, each feature may use one or more GUI pages and/or database tables, and the names of the GUI pages and/or database tables associated with each feature may be defined. In some embodiments, each feature may have one or more GUI pages and/or database tables dedicated to that feature, and possibly not used by any other feature. Nonetheless, features may also access non-dedicated GUI pages and/or database tables as well. Thus, software application 612 may be designed so that it uses one or more generic GUI pages and/or database tables that any feature can access, as well as distinct GUI pages and/or database tables for each individual feature.

License portal 618 may also allow definition of the type of license terms for each entitlement, such as a per-user, per-concurrent-user, per-seat, per-device, per-processor, per-core, or per-timeframe license. In some embodiments, license portal 618 may be used by third parties (e.g., entities other than that which operates or administrates the remote network management platform) to define licensing terms for third-party software applications.

Central instance 600 may include license database 602 and license administration module 604. License database 602 may receive and store definitions of licenses from license portal 618. Thus, license database 602 may be the authoritative source of licensing information for licensed software applications in the remote network management platform, and may store licensing information for tens, hundreds, or thousands of licenses.

License administration module 604 may be an interface (e.g., an API) between central instance 600 and other computational instances within the remote network management platform. Thus, license administration module 604 may provide entitlement information to these other computational instances regarding their respective licenses. License administration module 604 may also receive, from the other computational instances, requests for new licenses, requests for entitlements for an existing license, and/or usage data regarding license utilization. To that point, license administration module 604 is shown in FIG. 6A providing entitlements 614 to computational instance 606, and receiving requests and usage data 616 from computational instance 606.

The license usage data discussed herein may include, for software application 612 as an example: identifier(s) of software application 612 (e.g., a number or code), identifier(s) of computational instance 606 (e.g., another number or code), entitlement configuration (e.g., the mapping of features to entitlements), current and/or historical license utilization (e.g., current number of simultaneous users for a concurrent-user-based license), GUI pages and/or database tables used by each feature, and so on.

Computational instance 606 may include subscription administration module 608, license enforcement module 610, and software application 612. Subscription administration module 608 may be an interface (e.g., an API) between computational instance 606 and central instance 600 for purpose of communication regarding licenses involving computational instance 606.

License enforcement module 610 may allow or block transactions involving licensed software applications operating on computational instance 606. For example, license enforcement module 610 may receive a license definition from subscription administration module 608, including names of GUI pages and/or database tables used by each feature of software application 612, and the entitlement to which each feature belongs. Then, license enforcement module 610 may allow software application 612 access to GUI pages and/or database tables of features that are licensed, and block access to GUI pages and/or database tables of features that are not licensed. Additionally, license enforcement module 610 may block other software applications operating on computational instance 606 from accessing these GUI pages and/or database tables. For instance, the blocked GUI pages might not be accessible or viewable by a user, and the user interface in general might prevent blocked database tables from being viewed. This aspect of license enforcement module 610 may be referred to as an "access handler."

In some embodiments, license enforcement using the access handler or some other mechanism may be turned on or off on a per-instance basis. For example, a computational instance with live operation (i.e., a production instance) may have license enforcement turned on, while license enforcement may be turned off for development instances, testing instances, or other non-production instances.

B. Installing a Licensed Software Application

Software application 612 may be installed on computational instance 606 in the following fashion. Nonetheless, other possibilities exist.

An entity associated with computational instance 606 may determine that it is desirable to install software application 612 for users of computational instance 606. This entity may then access central instance 600 via a configuration interface to request installation of software application 612. Alternatively, the entity may request the installation through some other mechanism, such as a phone call or email. Regardless, the entity may identify software application 612 and determine which of entitlements 614 that it wishes to activate.

Once the entitlements to activate are determined, the entity may be presented with a cost for installation with the selected entitlements. This may be a one-time charge, a monthly charge, a quarterly charge, an annual charge, or some other mechanism. Assuming that the entity accepts the charge, central instance 600 may provide the appropriate program code, GUI pages, database table definitions, data, entitlements 614, and installation scripts to computational instance 606. Computational instance 606 may then use this information to install software application 612, which may include placing the program code and GUI pages in an appropriate location, creating the database tables, and populating these tables with the data. Computational instance 606 may also provide an authenticated (e.g., digitally signed) representation of entitlements 614 to license enforcement module 610.

In some embodiments, program code, GUI pages, database tables, and data for all entitlements (i.e., all optional features) of software application 612 may be installed. However, the access handler of license enforcement module 610 may block access to unlicensed features of entitlements 614 as described herein.

C. Entitlements and Features

As noted above, each of entitlements 614 may indicate that the access handler should allow or block access to one or more distinct features. Thus, access to each of these features may be controlled in this fashion by exactly one entitlement. Further, each feature may use one or more GUI pages and/or database tables of software application 612.

FIG. 6A depicts an arrangement of entitlements 614. Particularly, software application 612 includes six features, F1, F2, F3, F4, F5, and F6. As an example, software application 612 may be an HR application with optional features for health care insurance plans (F1), life insurance plans (F2), managerial reviews (F3), salary management (F4), retirement plans (F5), and performance bonuses (F6).

The entitlements design described herein allows various features to be grouped into entitlements so that they are purchased and activated as a unit. For instance, continuing with the example HR application, one entitlement of entitlements 614 controls access to the health care insurance plans (F1) and life insurance plans features (F2), another controls access to the managerial reviews feature (F3), and yet another controls access to the salary management (F4), retirement plans (F5), and performance bonuses features (F6). Thus, features are logically grouped by their general categories (e.g., an insurance entitlement, a reviews entitlement, and a compensation entitlement). Therefore, when an entity associated with a customer instance purchases the compensation entitlement, the salary management, retirement plans, and performance bonuses features are activated.

Furthermore, the entitlements design is flexible in how it defines the mapping of features to entitlements. For instance, each feature may be associated with its own entitlement, all features may be associated with just one entitlement, or the features may be distributed amongst a smaller number of entitlements. Also, the mapping of features to entitlements can be remapped or rearranged. For example, entitlements 614 may be modified so that features F1, F2, and F3 are all associated with the same entitlement.

When such a remapping takes place, license administration module 604 may provide an updated version of entitlements 614 to subscription administration module 608. Subscription administration module 608 may, in turn, provide the updated version of entitlements 614 to license enforcement module 610. License enforcement module 610 may then modify its enforcement procedures to be in compliance with the updated version of entitlements 614.

In general, license administration module 604 may provide a representation of entitlements 614 to subscription administration module 608 periodically, from time to time, or upon request. In some embodiments, license administration module 604 may provide a representation once per day or in response to any change to entitlements 614.

D. Enforcement of Entitlements

Figure 6B:
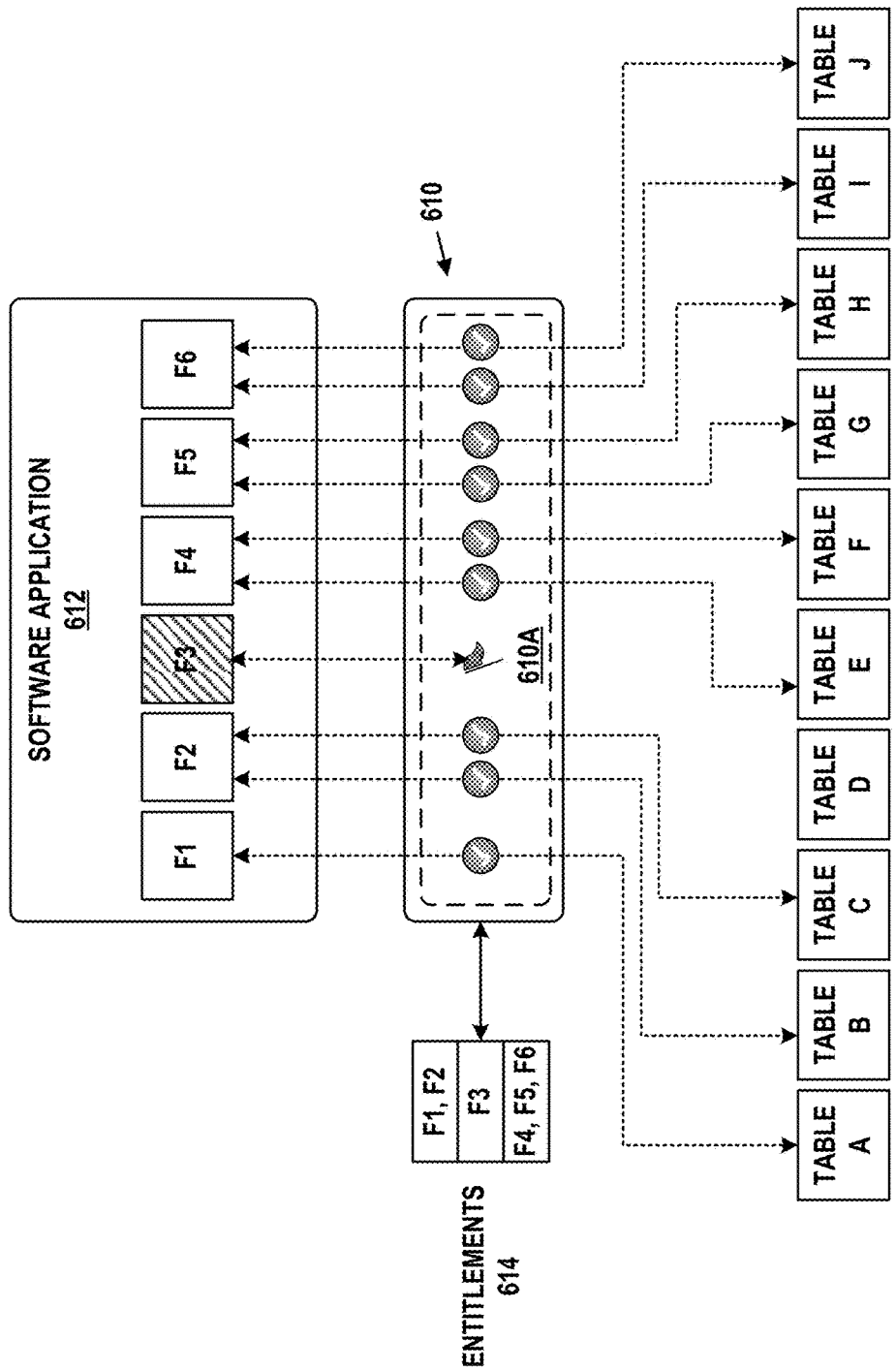
FIG. 6B further details the software licensing architecture, in accordance with example embodiments.

FIG. 6B depicts enforcement of entitlements by access handler 610A of license enforcement module 610. In this figure, feature F1 uses database table A, feature F2 uses database tables B and C, feature F3 uses database table D, feature F4 uses database tables E and F, feature F5 uses database tables G and H, and feature F6 uses database tables I and J.

Each of these features of software application 612 access their respective database tables through access handler 610A, as depicted by the dotted lines in FIG. 6B. Access handler 610A may check each database table access against entitlements 614 to determine whether that access is permitted. For instance, any request from software application 612 to create, read, modify, or delete data from one of database tables A-J may be compared to entitlements 614. If entitlements 614 permits such access, the request is allowed to pass through access handler 610A. If entitlements 614 does not permit such access, the request is blocked by access handler 610A.

To that point, in FIG. 6B is it assumed that computational instance 606 has purchased or otherwise gained access to the entitlement for features F1 and F2, as well as the entitlement for features F4, F5, and F6. But, computational instance 606 does not have access to the entitlement for feature F3. Accordingly, feature F3 is shown with hashmarks in FIG. 6B, while the other features are shown without hashmarks. Alternatively, feature F3 may be omitted from entitlements 614.

Also, access handler 610A is shown approving requests to access database tables A, B, C, E, F, G, H, I, and J, as depicted by the checkmarks though the dotted lines between these tables and their associated features. On the other hand, a flag is shown placed in the dotted line from feature F3 that would otherwise connect to database table D. This indicates that access handler 610A is blocking access to this table, in accordance with entitlements 614.

In some cases, access handler 610A blocking access to a database table may take the form of access handler 610A blocking create, modify, or delete operations on the table, while allowing read operations. In other words, access handler 610A might enforce the license only by blocking any access to the table that might change its contents.

Access handler 610A may similarly block or allow access to GUI pages specific to software application 612.

Advantageously, the relationships between features and entitlements can be changed, or remapped, dynamically.

Thus, individual entitlements can be added or removed from entitlements 614, and the relationships between features and entitlements can be modified, without having to reinstall or restart software application 612.

E. Integration with Third-Party Software Applications

In some embodiments, the remote network management platform may support distribution and licensing of third-party software applications. For purpose of this discussion, a third-party software application may be any application developed or licensed by an entity other than the entity that operates the remote network management platform. Nonetheless, in some situations, software applications that the remote network management platform develops or licenses may be distributed and licensed in the same or a similar fashion.

Figure 7:
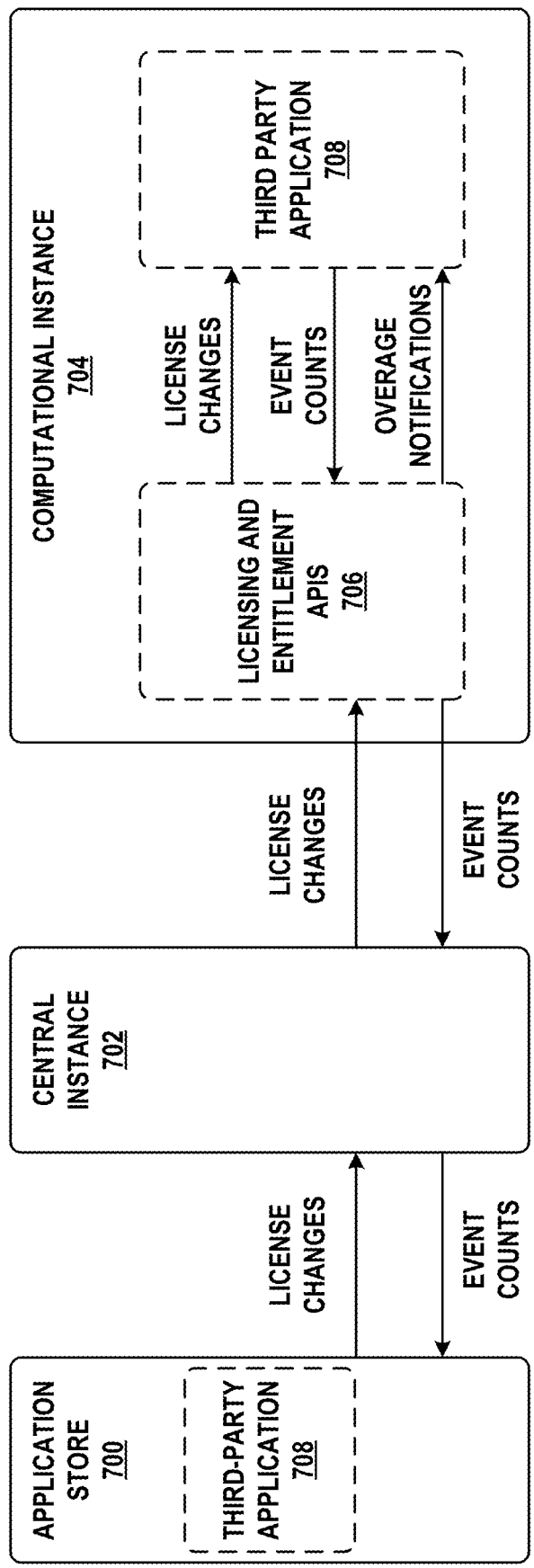
FIG. 7 is a software licensing architecture that supports third-party applications, in accordance with example embodiments.

FIG. 7 depicts a software licensing architecture that supports third-party applications. This architecture is similar to that of FIG. 6A, in that central instance 702 is in communication with computational instance 704 in order to exchange information related to licensing of software applications for computational instance 704. Thus, any of the embodiments or aspects described in relation to FIG. 6A (and FIG. 6B for that matter) may also apply to FIG. 7.

Additionally, an application store 700 may be disposed within the remote network management platform. As noted above, application store 700 may include a number of software applications developed and/or available for licensing. These software applications may be licensed to and installed on computational instances of the remote network management platform. Application store 700 may be contained within central instance 702, or may reside in a separate computational instance or elsewhere in the remote network management platform.

For example, third-party application 708 is shown in application store 700. The program code, GUI pages, database table definitions, data, entitlements, and installation scripts for third-party application 708 may be maintained in application store 700. When an entity associated with computational instance 704 purchases or otherwise acquires a license for third-party application 708, this application may be installed in computational instance 704 as described above. Furthermore, the license information may be provided to central instance 702 for distribution to computational instance 704 in accordance with the discussion above.

Once installed, third-party application 708 may communicate with central instance 702 regarding its license. This communication may take place by way of licensing and entitlement APIs 706. The operations of licensing and entitlement APIs 706 may include some or all of those ascribed to subscription administration module 608 and/or license enforcement module 610.

Thus, any changes made to the license for third-party application 708 may flow from application store 700, to central instance 702, to computational instance 704. These changes may include modifications of entitlements and/or remappings of entitlements to features.

Event counts may be metrics that represent the number of times that certain licensing events have occurred. For example, these licensing events may include a license seat being obtained, a license seat being released, and so on. Computational instance 704 may provide event counts to licensing and entitlement APIs 706, which may provide the event counts to central instance 702. Central instance 702 may, in turn, provide the event counts to application store 700.

In some embodiments, licensing and entitlement APIs 706 may maintain event counts related to third-party application 708. When these counts meet or exceed a threshold (e.g., the number of license seats in use equals the total number of license seats purchased), licensing and entitlement APIs 706 may inform third-party application 708 that either no more license seats are available, or there is a licensing overage. In the former case, licensing and entitlement APIs 706 may be arranged to block access for further users. In the latter case, licensing and entitlement APIs 706 may be arranged to allow such overages, so long as the entity using third-party application 708 has agreed to compensate the third party for the overage (e.g., by paying overage fees).

VI. EXAMPLE OPERATIONS

FIG. 8 is a flow chart illustrating an example embodiment. The process illustrated by FIG. 8 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 8 may be simplified by the removal of any one or more of the features shown therein. Further, these embodiments may be combined with features, aspects, and/or implementations of any of the previous figures or otherwise described herein.

Block 800 may involve transmitting, by a central computational instance of a plurality of computational instances disposed within a remote network management platform, authoritative representations of software application licensing information to other computational instances of the plurality of computational instances. The other computational instances may be dedicated to respective managed networks operated by respective entities.

Block 802 may involve receiving, by a particular computational instance of the plurality of computational instances and from the central computational instance, a representation of particular software application licensing information for a particular software application installed within the particular computational instance. The particular software application may include executable code and database tables. The representation may include a set of entitlements. An entitlement of the set of entitlements, when activated for the particular computational instance, allows the particular computational instance use of one or more features of the particular software application that are associated with the entitlement. The entitlement, when deactivated for the particular computational instance, prevents the particular computational instance from using the one or more features. Each feature associated with the entitlement uses one or more of the database tables.

Block 804 may involve preventing modification from within the particular computational instance, by an access handler of the particular computational instance, to any of the database tables used by features of the entitlements that are deactivated for the particular computational instance. The types of modifications prevented may include creation of, writing to, and deletion of database tables or records therein.

In some embodiments, the central computational instance is operated by an entity that also operates the remote network management platform as a whole.

In some embodiments, the authoritative representations of software application licensing information are provided to the other computational instances periodically or in response to requests from the other computational instances.

In some embodiments, each of the one or more features of the particular software application can be activated or deactivated by exactly one of the set of entitlements.

In some embodiments, the central computational instance includes a license database and a license administrator module. The license database may contain the authoritative representations of software application licensing information for optional software applications available to the other computational instances. The license administrator module may provide the authoritative representations of software application licensing information to the other computational instances.

In some embodiments, the particular computational instance includes a subscription administrator module and a license enforcement module. The subscription administrator module may receive the representation of the particular software application licensing information and provide at least some of the particular software application licensing information to the license enforcement module. The license enforcement module may control the access handler.

In some embodiments, each entitlement is represented as one or more rules interpretable by the access handler. The access handler may apply the rules to at least some attempts to access the database tables.

In some embodiments, the set of entitlements represents one or more groupings of features associated with the entitlements. The central computational instance may further carry out operations to: rearrange the one or more groupings so that at least one of the features is associated with a different one of the entitlements, and provide, to the other computing instances as part of the authoritative representations of the software application licensing information, the one or more groupings as rearranged. The particular computational instance may be further configured to: receive, as part of the representation of the particular software application licensing information, the one or more groupings as rearranged, and update operation of the access handler to be in compliance with the one or more groupings as rearranged.

In some embodiments, access to the database tables from within the particular computational instance occurs by way of a graphical user interface. Preventing modification of any of the database tables used by features of entitlements that are deactivated may involve preventing the modification to occur by way of the graphical user interface.

In some embodiments, a software application repository is disposed within the remote network management platform. The software application repository may support distribution of third-party software applications to the other computational instances. The third-party software applications may be supplied to the remote network management platform by entities other than an entity that operates the remote network management platform. Providing the authoritative representations of the software application licensing information to the other computational instances may involve providing authoritative representations of software application licensing information for the third-party software applications to the other computational instances.

VII. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid state drive, or another storage medium.

The computer readable medium can also include non-transitory computer readable media such as computer readable media that store data for short periods of time like register memory and processor cache. The computer readable media can further include non-transitory computer readable media that store program code and/or data for longer periods of time. Thus, the computer readable media may include secondary or persistent long term storage, like ROM, optical or magnetic disks, solid state drives, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A system comprising:
   a central computational instance of a plurality of computational instances disposed within a remote network management platform, wherein the central computational instance provides authoritative representations of software application licensing information to other computational instances of the plurality of computational instances, and wherein the other computational instances are dedicated to respective managed networks operated by respective entities;
   a particular computational instance of the plurality of computational instances, wherein the particular computational instance is configured to receive a representation of particular software application licensing information for a particular software application installed within the particular computational instance, wherein the representation includes a set of entitlements, wherein an entitlement of the set of entitlements, when activated for the particular computational instance, allows the particular computational instance use of one or more features of the particular software application that are associated with the entitlement, and wherein the entitlement, when deactivated for the particular computational instance, prevents the particular computational instance from using the one or more features, wherein the particular software application includes executable code and database tables, and wherein each feature associated with the entitlement uses one or more of the database tables; and
   an access handler of the particular computational instance configured to prevent access, from within the particular computational instance, to any of the database tables used by features of the entitlements that are deactivated for the particular computational instance, wherein the access handler references the set of entitlements to determine whether to prevent access to the database tables.

2. The system of claim 1, wherein the central computational instance is operated by an entity that also operates the remote network management platform.

3. The system of claim 1, wherein the authoritative representations of software application licensing information are provided to the other computational instances periodically or in response to requests from the other computational instances.

4. The system of claim 1, wherein each of the one or more features of the particular software application can be activated or deactivated by exactly one of the set of entitlements.

5. The system of claim 1, wherein the central computational instance includes a license database and a license administrator module, wherein the license database contains the authoritative representations of software application licensing information for optional software applications available to the other computational instances, and wherein the license administrator module provides the authoritative representations of software application licensing information to the other computational instances.

6. The system of claim 1, wherein the particular computational instance includes a subscription administrator module and a license enforcement module, wherein the subscription administrator module receives the representation of the particular software application licensing information and provides at least some of the particular software application licensing information to the license enforcement module, and wherein the license enforcement module controls the access handler.

7. The system of claim 1, wherein each entitlement is represented as one or more rules interpretable by the access handler, and wherein the access handler applies the rules to at least some attempts to access the database tables.

8. The system of claim 1, wherein the set of entitlements represents one or more groupings of features associated with the entitlements, and wherein the central computational instance is further configured to:
   rearrange the one or more groupings so that at least one of the features is associated with a different one of the entitlements; and
   provide, to the other computing instances as part of the authoritative representations of the software application licensing information, the one or more groupings as rearranged.

9. The system of claim 8, wherein the particular computational instance is configured to:
   receive, as part of the representation of the particular software application licensing information, the one or more groupings as rearranged; and
   update operation of the access handler to be in compliance with the one or more groupings as rearranged.

10. The system of claim 1, wherein access to the database tables from within the particular computational instance occurs by way of a graphical user interface, and wherein preventing access to any of the database tables used by features of entitlements that are deactivated comprises preventing the access by way of the graphical user interface.

11. The system of claim 1, further comprising:
    a software application repository disposed within the remote network management platform, wherein the software application repository supports distribution of third-party software applications to the other computational instances, and wherein the third-party software applications are supplied to the remote network management platform by entities other than an entity that operates the remote network management platform.

12. The system of claim 11, wherein providing the authoritative representations of the software application licensing information to the other computational instances comprises providing authoritative representations of software application licensing information for the third-party software applications to the other computational instances.

13. The system of claim 1, wherein the preventing access to the database tables comprises preventing read access, preventing write access, preventing create access, preventing delete access, or any combination thereof.

14. A method comprising:
    transmitting, by a central computational instance of a plurality of computational instances disposed within a remote network management platform, authoritative representations of software application licensing information to other computational instances of the plurality of computational instances, wherein the other computational instances are dedicated to respective managed networks operated by respective entities;

receiving, by a particular computational instance of the plurality of computational instances and from the central computational instance, a representation of particular software application licensing information for a particular software application installed within the particular computational instance, wherein the particular software application includes executable code and database tables, wherein the representation includes a set of entitlements, wherein an entitlement of the set of entitlements, when activated for the particular computational instance, allows the particular computational instance use of one or more features of the particular software application that are associated with the entitlement, wherein the entitlement, when deactivated for the particular computational instance, prevents the particular computational instance from using the one or more features, and wherein each feature associated with the entitlement uses one or more of the database tables; and preventing, via an access handler of the particular computational instance access from within the particular computational instance to any of the database tables used by features of the entitlements that are deactivated for the particular computational instance, wherein the access handler references the set of entitlements to determine whether to prevent access to the database tables.

15. The method of claim 14, wherein the central computational instance includes a license database and a license administrator module, wherein the license database contains the authoritative representations of software application licensing information for optional software applications available to the other computational instances, and wherein the license administrator module transmits the authoritative representations of software application licensing information to the other computational instances.

16. The method of claim 14, wherein the particular computational instance includes a subscription administrator module and a license enforcement module, wherein the subscription administrator module receives the representation of the particular software application licensing information and provides at least some of the particular software application licensing information to the license enforcement module, and wherein the license enforcement module controls the access handler.

17. The method of claim 14, wherein each entitlement is represented as one or more rules interpretable by the access handler, and wherein the access handler applies the rules to at least some attempts to access the database tables.

18. The method of claim 14, wherein the set of entitlements represents one or more groupings of features associated with the entitlements, the method further comprising:

rearranging the one or more groupings so that at least one of the features is associated with a different one of the entitlements; and providing, to the other computing instances as part of the authoritative representations of the software application licensing information, the one or more groupings as rearranged.

19. The method of claim 18, further comprising:

receiving, as part of the representation of the particular software application licensing information, the one or more groupings as rearranged; and updating operation of the access handler to be in compliance with the one or more groupings as rearranged.

20. The method of claim 14, wherein a software application repository is disposed within the remote network management platform, wherein the software application repository supports distribution of third-party software applications to the other computational instances, and wherein the third-party software applications are supplied to the remote network management platform by entities other than an entity that operates the remote network management platform.

* * * * *